US012760756B2

(12) United States Patent
Milem et al.

(10) Patent No.: US 12,760,756 B2
(45) Date of Patent: Oct. 13, 2026

(54) SURFACE COATINGS FOR DECREASING CLAMP LOAD LOSS

(71) Applicant: Caterpillar Inc., Peoria, IL (US)

(72) Inventors: John William Milem, Brimfield, IL (US); David Allen Akers, Morton, IL (US); Matthew Thomas Kiser, Peoria Heights, IL (US); Ryan Dean Macy, Peoria, IL (US); Christopher Allen Pollum, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 542 days.

(21) Appl. No.: 18/134,916

(22) Filed: Apr. 14, 2023

(65) Prior Publication Data

US 2024/0344542 A1 Oct. 17, 2024

(51) Int. Cl.
*F16B 5/02* (2006.01)
*F16B 2/00* (2006.01)

(52) U.S. Cl.
CPC ................ *F16B 5/02* (2013.01); *F16B 2/005* (2013.01)

(58) Field of Classification Search
CPC ........................................................ F16B 2/005
See application file for complete search history.

(56) References Cited

U.S. PATENT DOCUMENTS 3,828,515 A * 8/1974 Galgoczy .................. F16B 5/02 403/279
4,098,500 A 7/1978 Lenz
4,333,222 A * 6/1982 Melin ..................... B32B 15/08 29/445
6,095,733 A 8/2000 Busby et al.
6,116,108 A 9/2000 Sturm
6,322,132 B1 11/2001 Hasselgruber
8,834,120 B2 9/2014 De Ugarte et al.
10,017,020 B2 * 7/2018 Andreasen .............. F16B 39/28
10,941,794 B2 3/2021 Bui et al.
11,015,625 B2 * 5/2021 Grimm ................... F16B 2/005
2005/0279186 A1 12/2005 Leigh et al.
2021/0239027 A1 8/2021 Zhang et al.

FOREIGN PATENT DOCUMENTS

CN 208880171 5/2019
DE 4110362 A1 * 10/1991 .............. F16B 31/04
WO WO2010118747 A1 10/2010

OTHER PUBLICATIONS

European Search Report for Europe Patent Appln. No. 24162519.3, mailed Apr. 23, 2024 (7 pgs).

* cited by examiner

*Primary Examiner* — Michael P Ferguson

(57) ABSTRACT

A machine, such as a hauler at a mining site, includes one or more bolted (clamped) joints. Friction coatings are applied to surfaces of two or more materials being clamped to reduce clamp load loss. The friction coatings include one or more coated surfaces and one or more interstitial spaces between the coated surfaces. Various materials may be used as the friction coating including, but not limited to, a tungsten/carbide or stellite/carbide alloy, iron base alloys such as POLYMET alloys, including PMET 290 (an alloy of iron, chromium, boron, manganese, silicone, and nickel), a nickel chromium alloy, e.g., Ni-20Cr, aluminum oxide ($Al_2O_3$) particles, and various combinations of these and other suitable materials.

15 Claims, 8 Drawing Sheets

SURFACE COATINGS FOR DECREASING CLAMP LOAD LOSS

TECHNICAL FIELD

The present disclosure relates generally to methods for applying materials to increase friction and/or decrease clamp load loss in bolted joints.

BACKGROUND

Machines and other types of equipment often have one or more bolted (clamped) joints. While the size, shape, and application of bolted joints may vary, the general application is the same. A bolt is inserted through a space in two or more materials, whereby a nut threaded onto the bolt is used to compress the two or more materials together. The amount of compression varies depending on the materials being compressed, the capability of the bolt and joint to sustain a certain amount of compression, and the amount of compression applied by a user when compressing the two or more materials together.

Over time, as equipment is used that have bolted joints, failures can occur. One reason for failure may be a complete failure of the bolt/nut system, whereby the bolt or nut sheers and separates, causing a complete failure of the compression of the bolted joint. Another reason for failure may be a reduction of the friction between the compressed interface(s) of the two or more materials being compressed. The reduced friction can allow the two or more materials to "slip," in reference to each other. Repeated slipping back and forth causes bolt self-loosening.

When some interfaces experience reduced friction, parts that were previously secured may experience slippage and can cause damage to or failure of the equipment or machine itself. Various approaches have been attempted to maintain the friction between compressed interfaces. One approach is described in International Application No. WO2010118747 to Brorson ("the '747 application"). The '747 application describes the use of a friction member to reduce the potential of mutual shear movement in the interface between mating surfaces. The friction member of the '747 application is inserted between the mating surfaces prior to compression. However, such a friction member is an additional part that is used to reduce friction loss. This can increase costs associated with the operation and maintenance of the equipment. Further, damage to the friction member can result in the introduction of pieces of the friction member into various parts of the equipment. Additionally, if the friction member is not designed to withstand the operating conditions experienced by the friction member, the friction member may fail, resulting in a potential complete loss of friction between the mated surfaces.

Examples of the present disclosure are directed to overcoming these and other deficiencies of such systems.

SUMMARY

In one aspect of the present disclosure, a machine includes a frame, and a first component associated with the frame, the first component having a first surface, and a friction coating deposited at a plurality of regions on the first surface, each region of the plurality of regions being separated from a remainder of the plurality of regions by an interstitial space of the first surface that is without the friction coating, a second component associated with the frame, the second component having a second surface, and a fastener applying compressive force to the first component and the second component, the friction coating deposited at the plurality of regions on the first surface being held in contact with the second surface by the fastener.

In another aspect of the present disclosure, a joint includes a first material having a first surface, a second material having a second surface, wherein the first surface is in compressive contact from a compressive force with the second material at an interface between the first surface of the first material and the second surface of the second material, a bolt inserted through the first material and second material, wherein the compressive force is provided by a nut tightened onto the bolt, a plurality of friction coatings deposited onto the first surface or the second surface, and a plurality of interstitial spaces between one or more of the plurality of friction coatings.

In a still further aspect of the present disclosure, a method of compressing a first component against a second component includes applying a plurality of friction coatings to a first surface of the first component, wherein the first surface comprises a friction coating deposited at a plurality of regions on the first surface, each region of the plurality of regions being separated from a remainder of the plurality of regions by an interstitial space of the first surface that is without the friction coatings, placing the first surface of the first component in contact with a second surface of a second component, wherein the plurality of friction coatings are at an interface between the first surface and the second surface, and applying a compressive force to compress the first surface against the second surface, wherein the compressive force causes deformation of at least a portion of the second surface by the friction coating such that the interstitial space of the first surface contact corresponding portions of the second surface.

In an additional aspect of the present disclose, a joint formed using a first component and a second component is formed by applying a plurality of friction coatings to a first surface of a first material, wherein the first surface further comprises at least one interstitial space between at least a portion of the plurality of friction coatings, wherein the friction coatings are comprised of a tungsten/carbide alloy, a stellite/carbide alloy, an alloy of iron, chromium, boron, manganese, silicone, and nickel, or Ni-20Cr, aluminum oxide (Al2O3) particles, placing the first surface of the first material in contact with a second surface of a second material, wherein the plurality of friction coatings are at an interface between the first surface and the second surface, and applying a compressive force to the first material and the second material.

DETAILED DESCRIPTION

Wherever possible, the same reference numbers will be used throughout the drawings to refer to same or like parts.

Figure 1:
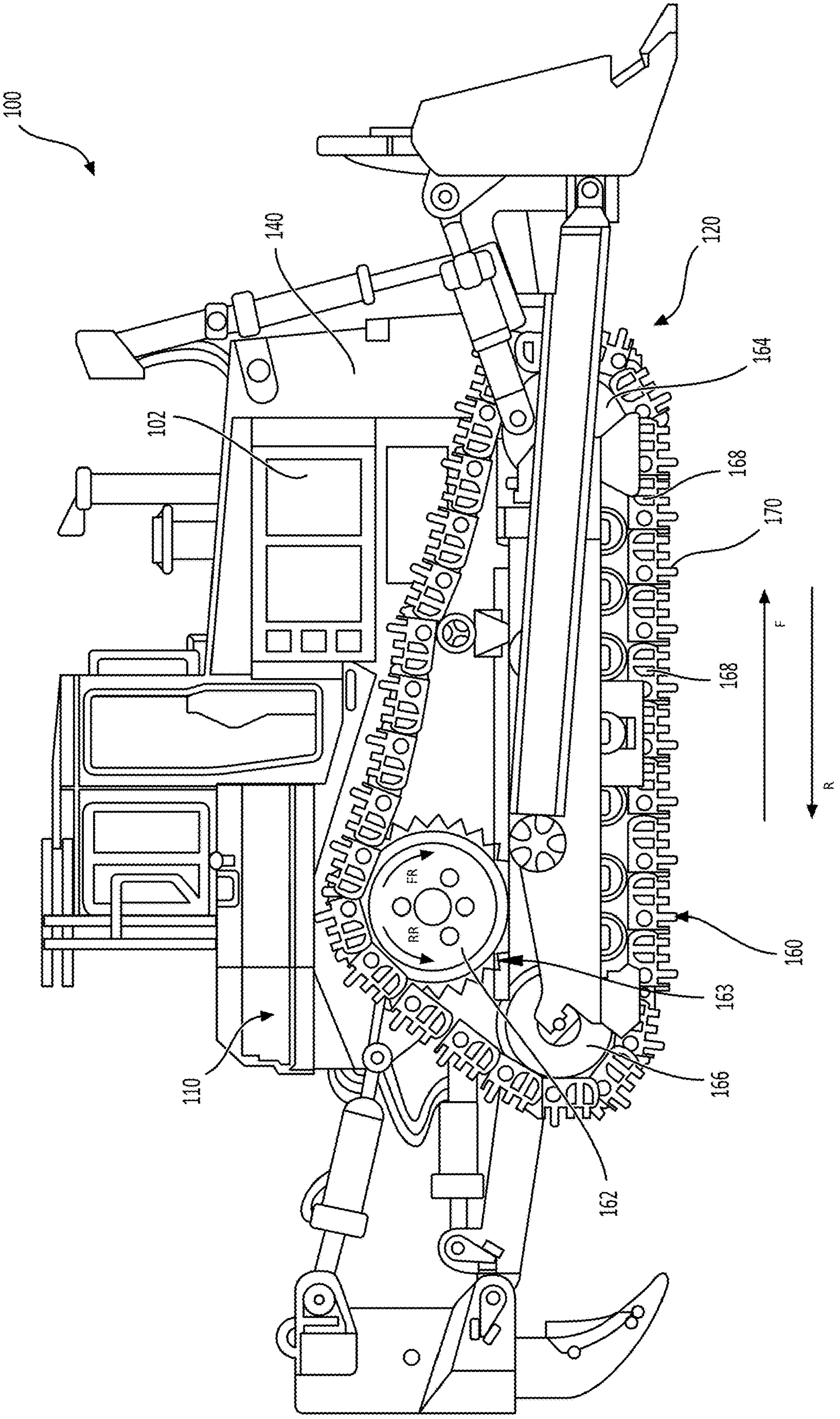
FIG. 1 is a schematic illustration of a system as an example machine with one or more components formed in accordance with example embodiments of the disclosure.

Turning now to the figures, FIG. 1 is a schematic illustration of machine 100 with one or more components formed in accordance with example embodiments of the disclosure. The machine 100 illustrated in FIG. 1 is a track type machine, though it should be understood that the presently disclosed subject matter is not limited to any particular machine. In some examples, the machine 100 may be any suitable machine with or without a track-type undercarriage 120, such as, a dozer, loader, excavator, tank, backhoe, drilling machine, trencher, haul truck, compaction machine, paving machine, cold planer, motor grader, automobile, or any other on-road or off-road vehicle. In further examples, the machine 100 may be used in still further applications such as, but not limited to, generators, machines for oil rigs, machines for ships, and the like. Additionally, the presently disclosed subject matter may be used in a machine 100 or other equipment that is either stationary or moving. The presently disclosed subject matter is not limited to any particular type or use of a machine. Any references in the presently disclosed subject matter to any particular type or use of a machine is merely for purposes of illustrating an example of the presently disclosed subject matter.

The machine 100 includes one or more prime movers (e.g., a power source 102) that provide power to the machine 100. For example, the power source 102 can be one or more various types of sources of power that provide energy to the machine 100 to operate the various systems and components of the machine 100. For the power source 102 can be a combustion engine (e.g., a diesel engine) that combusts a fuel to provide mechanical energy to the machine 100. In another example, the power source 102 can be a battery that provides electrical energy to the machine 100. In a still further example, the power source 102 can be an electrically conductive tether attached to a source of electrical power. The presently disclosed subject matter is not limited to any particular type or number of the power source 102. The example embodiment of the machine 100 includes a track-type undercarriage 120.

The machine 100 includes a frame 140 having a first track chain assembly 160 disposed on a first side 110 thereof, and a second track chain assembly (not shown) disposed on a second side (not shown) thereof. The second side is in opposing relationship to the first side 110. Together, the track assemblies are adapted to engage the ground, or other surface, to propel the machine 100 in a backward and/or forward direction.

It should be appreciated that the track chain assemblies of the machine 100 may be similar and, further, may represent mirror images of one another. As such, only the first track chain assembly 160 will be described herein. It should be understood that the description of the first track chain assembly 160 may be applicable to any number of second track chain assemblies, as well. Other embodiments, in accordance with the disclosure, may include more than two track chain assemblies. Thus, the apparatus, systems, and methods, as disclosed herein, apply to any suitable machine, or variations thereof. Additionally, the disclosed components of the machine 100 and the mechanism of formation thereof, as discussed herein, may also apply to other systems, such as non-track type machines and/or other mechanical systems. While the machine 100 is illustrated in the context of a track-type machine, it should be appreciated that the present disclosure is not thereby limited, and that a wide variety of other machines having tracks are also contemplated within the present context. For example, in other embodiments, the track chain assembly 160 can be included in a conveyor system, as a track for transmitting torque between rotating elements, or in any other application known to those skilled in the art.

Figure 2:
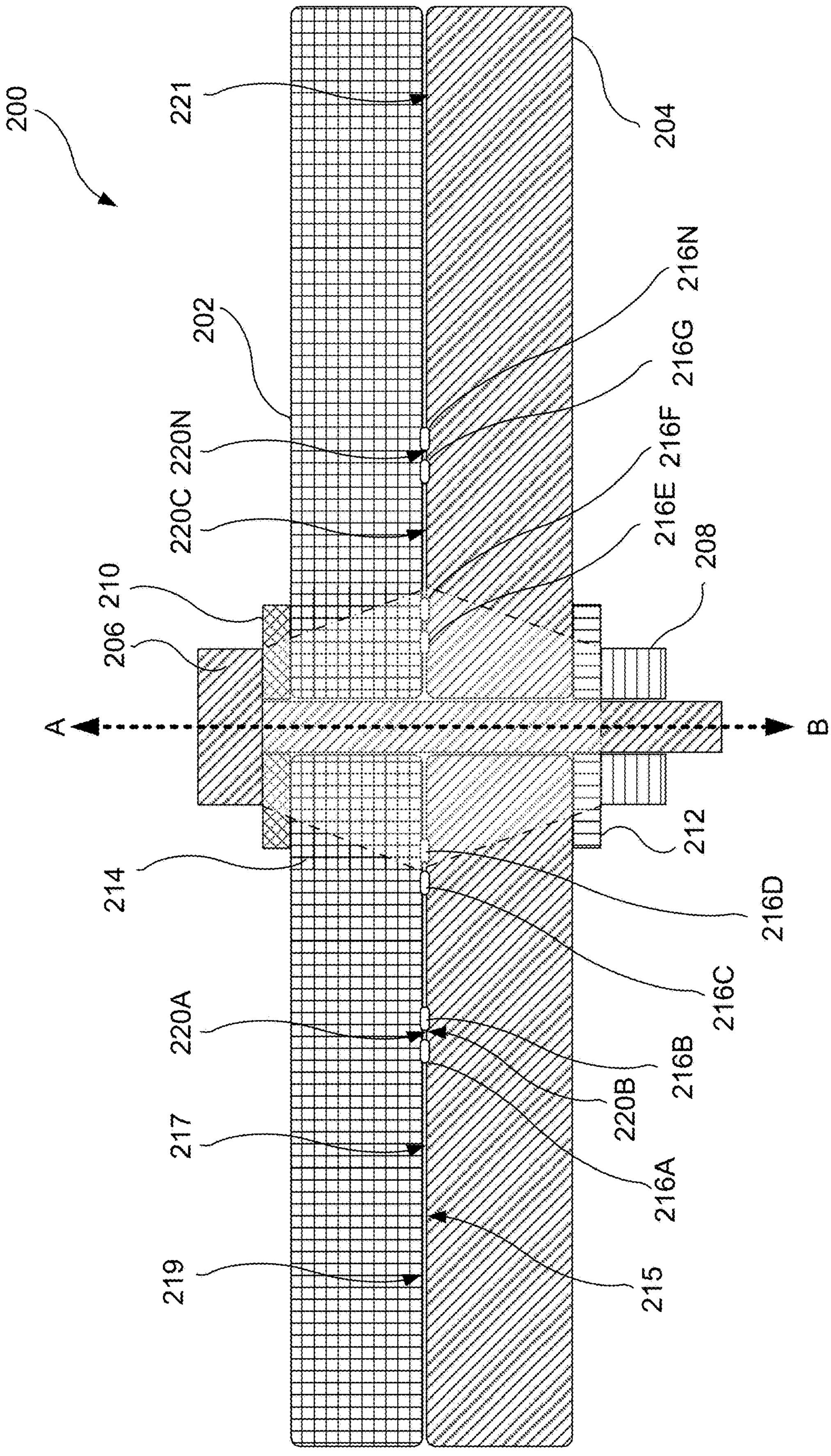
FIG. 2 illustrates a longitudinal cross-section of a clamped interface, in accordance with various examples of the presently disclosed subject matter.

Returning to FIG. 1, the first track chain assembly 160 extends about a plurality of rolling elements such as a drive sprocket 162, a front idler 164, a rear idler 166, and a plurality of track rollers 168. The drive sprocket 162 includes a plurality of sprocket teeth 163 that engage a pin, illustrated below; of the first track assembly 160. The track chain assembly 160 includes a plurality of ground-engaging track shoes 170 for engaging the ground, or other surface, and propelling the machine 100. During a typical operation of the undercarriage 120, the drive sprocket 162 is driven in a forward rotational direction FR. When rotating in the forward rotational direction FR, the sprocket teeth 163 of the drive sprocket 162 cause the drive the track chain assembly 160 to move forward in direction F. Thus, moving the machine 100 also in the forward direction F. In some examples, the drive sprockets 162 of the undercarriage 120 can be independently operated to turn the machine 100. As the sprocket teeth 163 engage and move the track chain assembly 160, wear and tear may occur on the various parts of the track chain assembly 160. During the operation of the machine 100, various clamped interfaces that may use bolts or other types of hardware to clamp (or compress) two or more materials together under pressure may experience clamp load loss. FIG. 2 is an example showing the use of a treated surface that can be used to maintain friction between two or more clamped surfaces.

FIG. 2 illustrates a longitudinal cross-section of a clamped interface 200, in accordance with various examples of the presently disclosed subject matter. The clamped interface 200 includes a first material 202 and a second material 204. The first material 202 and the second material 204 may be constructed of various types of materials include, but not limited to, metals and their alloys, ceramics, and various types of plastics or composites suitable for receiving a clamping force. The first material 202 is clamped to the second material 204 using a bolt 206 and a nut 208. It should be noted that other technologies for clamping may be used and are considered to be within the scope of the presently disclosed subject matter, technologies include, but not limited to, rivets, welded studs, threaded fasteners and tapped holes, threaded components, and the like.

In FIG. 2, the bolt 206 is inserted through the first material 202 and the second material 204 and is engaged to the nut 208. The nut 208 is threaded onto the bolt 206 and rotated to a desired degree to compress the first material 202 onto the second material 204. A first washer 210 and a second washer 212 are used to protect the first material 202 and second material 204, respectively, as well as distribute pressure and to assist the compression operation, among other uses. The compression operation, wherein the first material 202 is in compressive contact with the second material 204 from the compressive force generated by the bolt 206 and nut 208, described hereinabove creates a cone of compression 214. As used herein, the cone of compression 214 represents the member stiffness of the bolt 206 along the linear length of the bolt 206 along axis AB, showing the stress effected zone of the first washer 210 and the second washer 212 resulting from the compression caused by the nut 208 threading onto the bolt 206.

Clamp load loss can occur while the first material 202 and the second material 204 are clamped (or otherwise compressed) together caused by the nut 208 threaded onto the bolt 206. To reduce issues relating to the movement of the first material 202 in relation to the second material 204 resulting from the clamp load loss, friction coatings 216A-216N (generically referred to herein as "the friction coatings 216," and individually as "the friction coating 216A," "the friction coating 216B," and the like) are deposited onto an upper surface 215 of the second material 204, in the interface 217 between the upper surface 215 of the second material and the lower surface 219 of the first material 202. The friction coatings are deposited in an interface 221 between the first material 202 and the second material 204. In some examples, the hardness of the friction coatings 216 are at least as great as (equal) or greater than the hardness of at least the first material 202 or the second material 204. The friction coating 216 provides microscopic, elevated surfaces in the interface. When the first material 202 and the second material 204 are clamped (or otherwise compressed) together, the particles forming the friction coatings 216 cause the deformation of the second material 204 and/or the first material 202 at the friction coatings 216. In some examples, the deformation of the second material 204 and/or the first material 202 allow corresponding interstitial spaces 220 to come into contact with each. For example, the interstitial space 220A on the surface of the first material 202 is in contact with the interstitial space 220B on the surface of the second material 204.

The friction coatings 216 are deposited using various application technologies including, but not limited to, a high velocity air fuel (HVAF) process. It should be noted that other deposition processes may be used and are considered to be within the scope of the presently disclosed subject matter, including, but not limited to, High-Velocity Oxygen-Fuel (HVOF), a plasma-arc spray, a twin-wire arc spray, glued particle process, or a cold spray.

The High Velocity Oxygen Fuel (HVOF) process is when fuel and oxygen are fed into a combustion chamber and ignited and combusted continuously. The fuels can be gases (hydrogen, methane, propane, propylene, acetylene, natural gas, etc.) or liquids (kerosene, Ethanol, and the like). The High Velocity Air Fuel (HVAF) process is similar to the HVOF process but feeds air rather than oxygen into the combustion chamber for ignition. Plasma-arc spraying is a process whereby a stream of high temperature plasma and a powder coating are carried via an electric arc to a surface for deposition. Twin-wire arc spraying is a process that uses an electric arc between two consumable electrodes of the surfacing materials as the heat source. A compressed gas atomizes and propels the molten material to the surface for deposition.

Cold Spray is a process whereby a stream of pressurized gas is split into two streams, one of which passes through a powder feeder and collects powdered feedstock material for deposition and the other passes through a heater to expand the gas and increase a sonic velocity thereof. The two gas streams are then recombined and pass through a nozzle before accelerating the powdered feedstock where it deforms on the surface forming a deposition. A glued particle process involves depositing the friction coating onto one or more surfaces using a chemical adhesive to adhere the friction coatings onto the surface. For example, the friction coatings 216 may be applied first to an acetate or paper backed "sticker" in a desired pattern and then applied to one or more of the surfaces. In another example, an adhesive can be applied to the friction coatings 216 and then deposited onto one or more of the surfaces. In a still further example, one or more of the surfaces can have an adhesive applied to at least a part of the surfaces, whereby the friction coatings 216 are deposited onto the adhesive.

As used herein, "high velocity" generally means a deposition process in which material is deposited using propellants that accelerate the deposited materials at spray rates of around 800 m/s to 1400 m/s, though velocities higher and lower than that range can be used and are considered to be within the presently disclosed subject matter. As used herein, an HVAF process is a thermal spray process for deposition of coatings for protection of parts, vessels and structures against abrasion, erosion, and corrosion. The HVAF process runs on a fuel gas such as Propane, Propylene, or Natural gas (supplied from cylinders or gas line at 140 psi), and compressed air (supplied by a 400 CFM air compressor at 125 psi). Other examples of deposition technology include, but are not limited to, twin wire arc, low energy welding, electro spark deposition, or glued particles. Various materials may be used as the friction coating 216. These materials include, but are not limited to, a tungsten/carbide or stellite/carbide alloy, iron base alloys such as PMET 290 (an alloy of iron, chromium, boron, manganese, silicone, and nickel), a nickel chromium alloy, e.g., Ni-20Cr, aluminum oxide ($Al_2O_3$) particles, and various combinations of these and other suitable materials.

In some examples, the particles forming the friction coatings can be of various sizes at or from approximately 5 μm up to and including approximately 200 μm. The ranges provided herein are for purposes of providing examples. As used herein, a "particle size" is an average diameter of the particle. Thus, when measuring various diameters of a particle, some specific diameters may be different than other diameters of the particle and some diameters may be less than 5 μm and some diameters may be more than 200 μm. In some examples, various particle sizes of the friction coatings can be achieved using various deposition processes, such as those described above. For example, various ranges of the particle sizes and the deposition processes can be: HVAF with a particle size range of approximately 5 to approximately 45 μm; HVOF with a particle size range of 5-53 μm; Cold Spray with a particle size range of 5-53 μm; Laser Cladding with a particle size range of 45-125 μm; and PTA with a particle size range of 53-200 μm. It should be noted that when using these and other deposition processes, the presently disclosed subject matter is not limited to the ranges provided above In some examples, the second material 204 further includes interstitial spaces 220A-220N (generically referred to herein as "the interstitial spaces 220," and individually as "the interstitial space 220A," "the interstitial space 220B," and the like). The interstitial spaces 220 are areas on the upper surface 215 of the second material 204 between the friction coatings 216. In these examples, the friction coatings 216 do not completely coat the upper surface 215 of the second material 204. Rather, the friction coatings 216 coat only a portion of the upper surface 215 of the second material 204, with the interstitial spaces 222 between the coated portions of the upper surface 215 of the second material 204, illustrated in more detail in FIG. 3.

Figure 3:
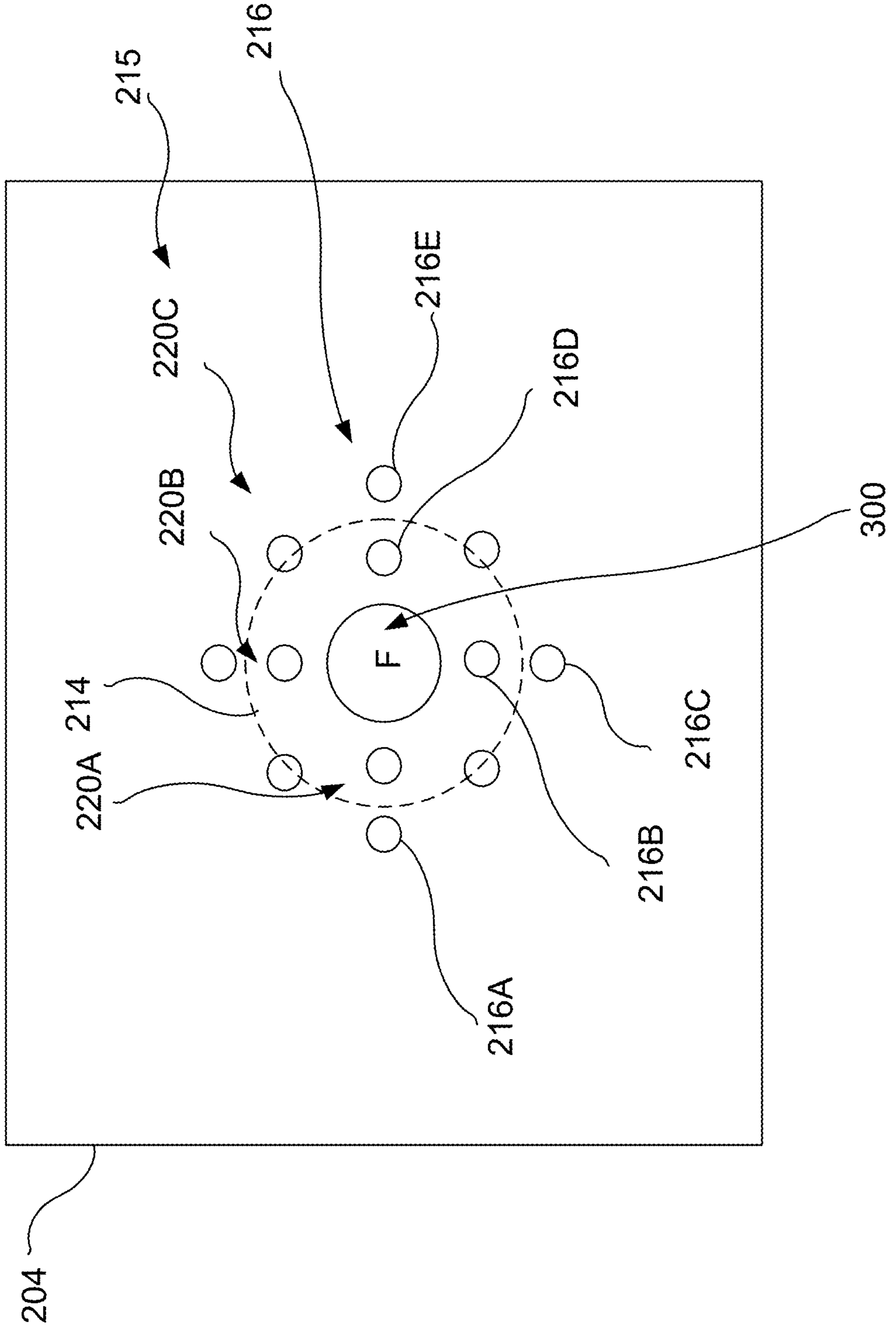
FIG. 3 is a top-down illustration of a surface of a material showing the placement of the friction coatings and the interstitial spaces, in accordance with various examples of the presently disclosed subject matter.

FIG. 3 is a top-down illustration of the upper surface 215 of the second material 204 showing the placement of the friction coatings 216 and the interstitial spaces 220, in accordance with various examples of the presently disclosed subject matter. As illustrated in FIG. 3, the friction coatings 216 are deposited or applied to the upper surface 215 of the second material 204. Interstitial spaces 220 separate the friction coatings 216. As shown in FIG. 3, the friction coatings 216 may be deposited or applied within the cone of compression 214. For example, the friction coatings 216A, 216C, and 216E are located outside of the cone of compression 214, whereas, for example, the friction coatings 216B and 216D are located within the cone of compression 214. It should be noted that, in some examples, all of the friction coatings 216 may be deposited or applied within the cone of compression on the upper surface 215 of the second material 204. In further examples, as illustrated in FIG. 3, some of the friction coatings 216 may be deposited or applied within, or inside, the cone of compression on the upper surface 215 of the second material 204, while additional friction coatings 216 may be deposited or applied outside of the cone of compression on the upper surface 215 of the second material 204. Additionally, it should be noted that the deposition or application of the friction coatings on only the upper surface 215 of the second material 204 is merely an example, as a portion of the friction coatings may also be applied to the lower surface 219 of the first material 202.

Figure 4:
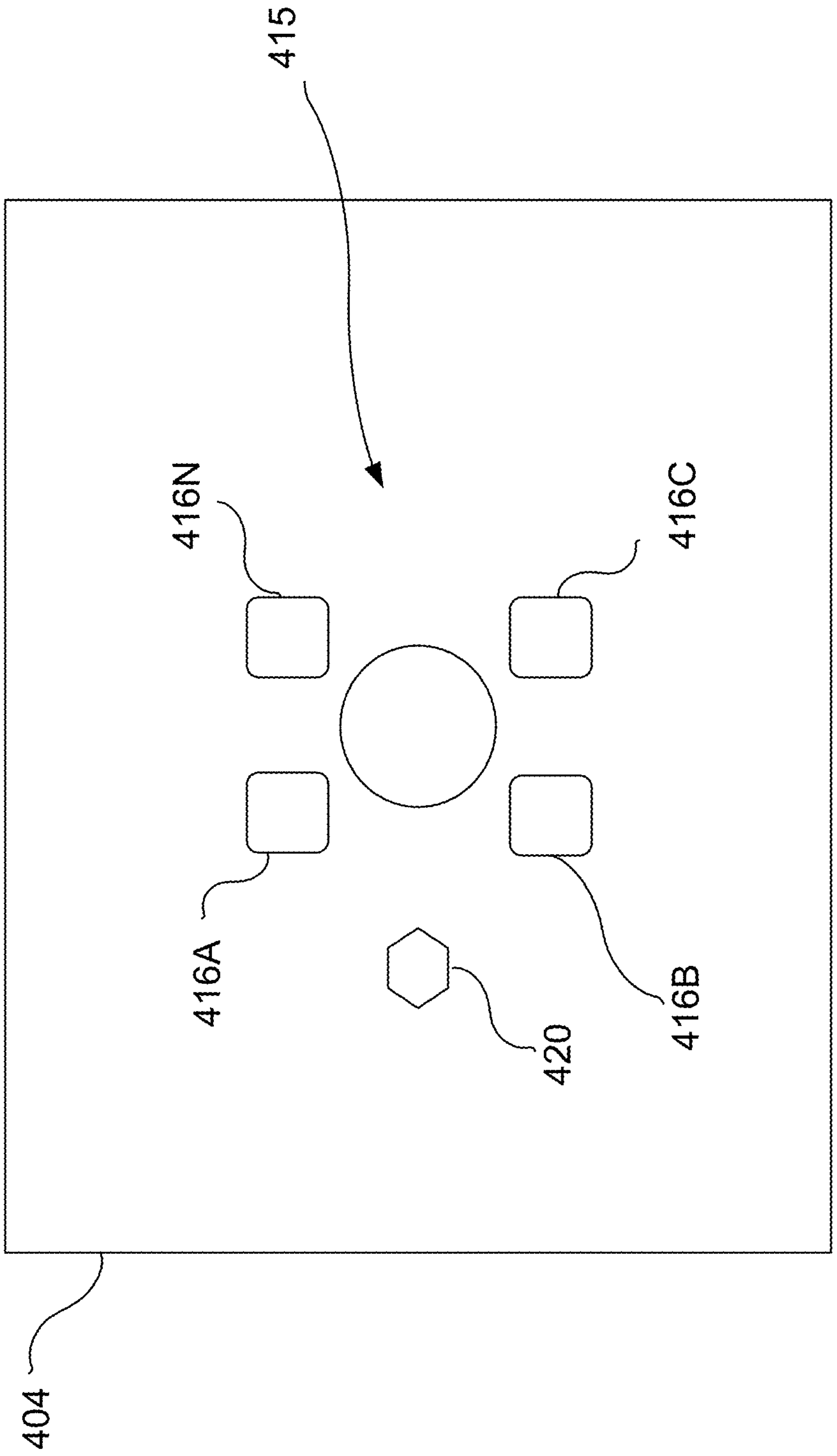
FIG. 4 is a top-down illustration of a surface of a material showing friction coatings, in accordance with various examples of the presently disclosed subject matter.

The friction coatings 216 may be deposited or applied using various patterns and in various shapes. In FIG. 3, the friction coatings 216 have been applied in a generally circular pattern or circular shape distally from center F of void 300. The void 300 is the space though which the bolt 206 is inserted through the second material 204. Further, in the example illustrated in FIG. 3, the friction coatings 216 are generally circular in shape. However, this is merely by way of illustration, as other examples of the friction coatings 216 may be spaced and shaped differently in other configurations. FIG. 4 illustrates an alternate example in which friction coatings are applied in a different pattern and in a different shape than the friction coatings 216 of FIG. 3.

Figure 5:
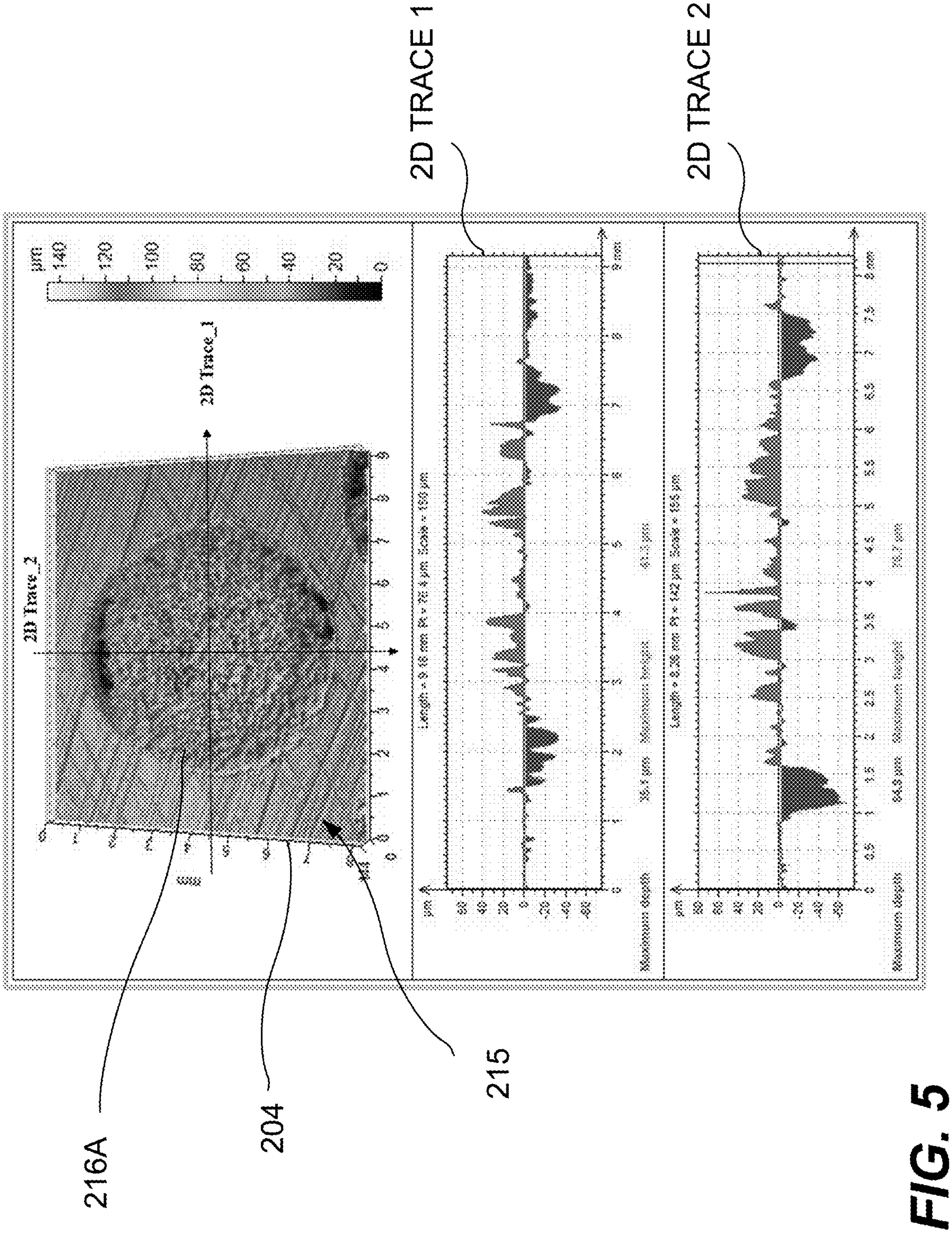
FIG. 5 is a white light interferometry scan showing top-down view of a surface of a material showing friction coatings, in accordance with various examples of the presently disclosed subject matter.
Figure 6:
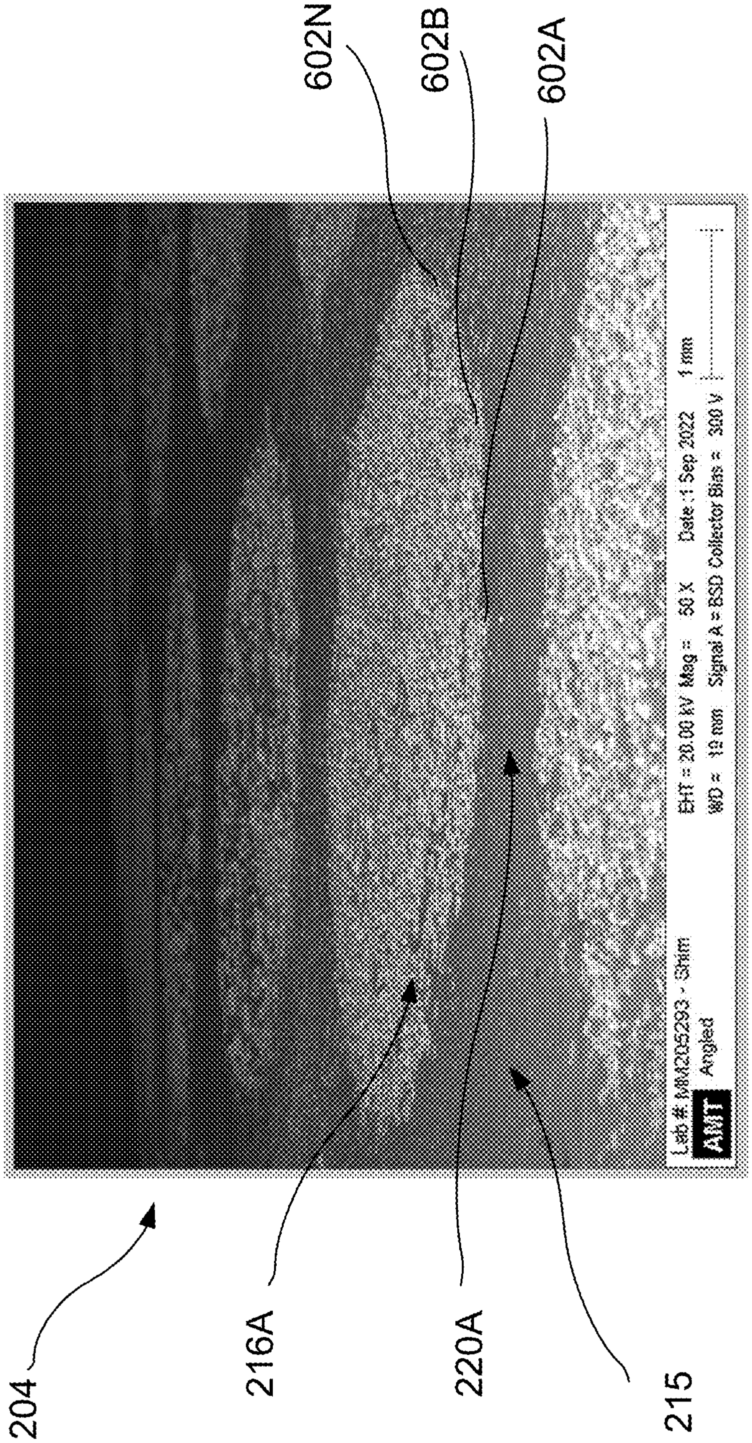
FIG. 6 is an image of a side view of a surface of a material showing the placement of friction coatings and interstitial spaces, in accordance with various examples of the presently disclosed subject matter.

FIG. 4 is a top-down illustration of an upper surface 415 of a second material 404, in accordance with various examples of the presently disclosed subject matter. Illustrated in FIG. 4 are friction coatings 416A-416N (generically referred to herein as "the friction coatings 416," and individually as "the friction coating 416A," "the friction coating 416B," and the like). As shown in FIG. 4, the friction coatings 416 are generally a rectangular or square shape. It should be noted that the presently disclosed subject matter is not limited to any particular shape of the friction coatings 416, nor is the presently disclosed subject matter limited to a single shape, as the friction coatings 416 may be deposited or applied in various shapes on a single surface. This is illustrated by way of example as friction coating 420, which is generally hexagonal in shape. FIGS. 5-6 are white light interferometry and scanning electron microscope images of the friction coatings 216.

FIG. 5 is white light interferometry scan showing a top-down view of the upper surface 215 of the second material 204 of FIGS. 2 and 3, in accordance with various examples of the presently disclosed subject matter. Shown are the friction coating 216A. Traces 1 and 2 across the upper surface 215 of the second material 204 were taken. The traces 1 and 2 are used to measure the height along various locations of the friction coating 216A. Viewing the trace 1, the friction coating 216A has a profile having multiple heights of the friction coating 216A above the upper surface 215 of the second material. A height above the upper surface 215 of the second material indicates a thickness of the friction coating 216A, whereas a depth below the upper surface 215 of the second material indicates a void or depression in the upper surface 215 of the second material. For example, at around 7 mm along the trace 1, the depth of the trace 1 is approximately 40 μm, while around 5.5 mm along the trace 1, the height of the trace 1 is approximately 40 μm, indicating a thickness of the friction coating 216A at that location. In a similar manner, viewing the trace 2, the friction coating 216A has a profile having multiple heights of the friction coating 216A above the upper surface 215 of the second material. For example, at around 7 mm along the trace 2, the depth of the trace 2 is approximately 30 μm, while around 5.25 mm along the trace 2, the height of the trace 2 is approximately 38 μm, indicating a thickness of the friction coating 216A at that location. The heights and depressions, along with the interstitial space 220A are further illustrated in FIG. 6.

FIG. 6 is a side view image of the upper surface 215 of the second material 204 of FIGS. 2 and 3 showing the placement of the friction coatings 216 and the interstitial spaces 220), in accordance with various examples of the presently disclosed subject matter. As illustrated in FIG. 4, the friction coatings 216A are deposited or applied to the upper surface 215 of the second material 204. The interstitial space 220A separates the friction coatings 216. FIG. 6 also shows particles that form the friction coatings 216. For example, the friction coating 216A is shown with particles 602A, 602B, and 602N. As described above in FIG. 2, the particles 602A, 602B, and 602N, as well as the other particles not identified but shown in FIG. 6, can be deposited using various technologies and have various sizes. For example, as noted above, in some examples, the range of sizes of the particles 602A, 602B, and 602N forming the friction coatings 216 can be of various sizes at or from approximately 5 μm up to and including 200 μm. As noted above, various methods may be used to deposit the friction coatings 216, illustrated by way of example in FIG. 7.

Figure 7:
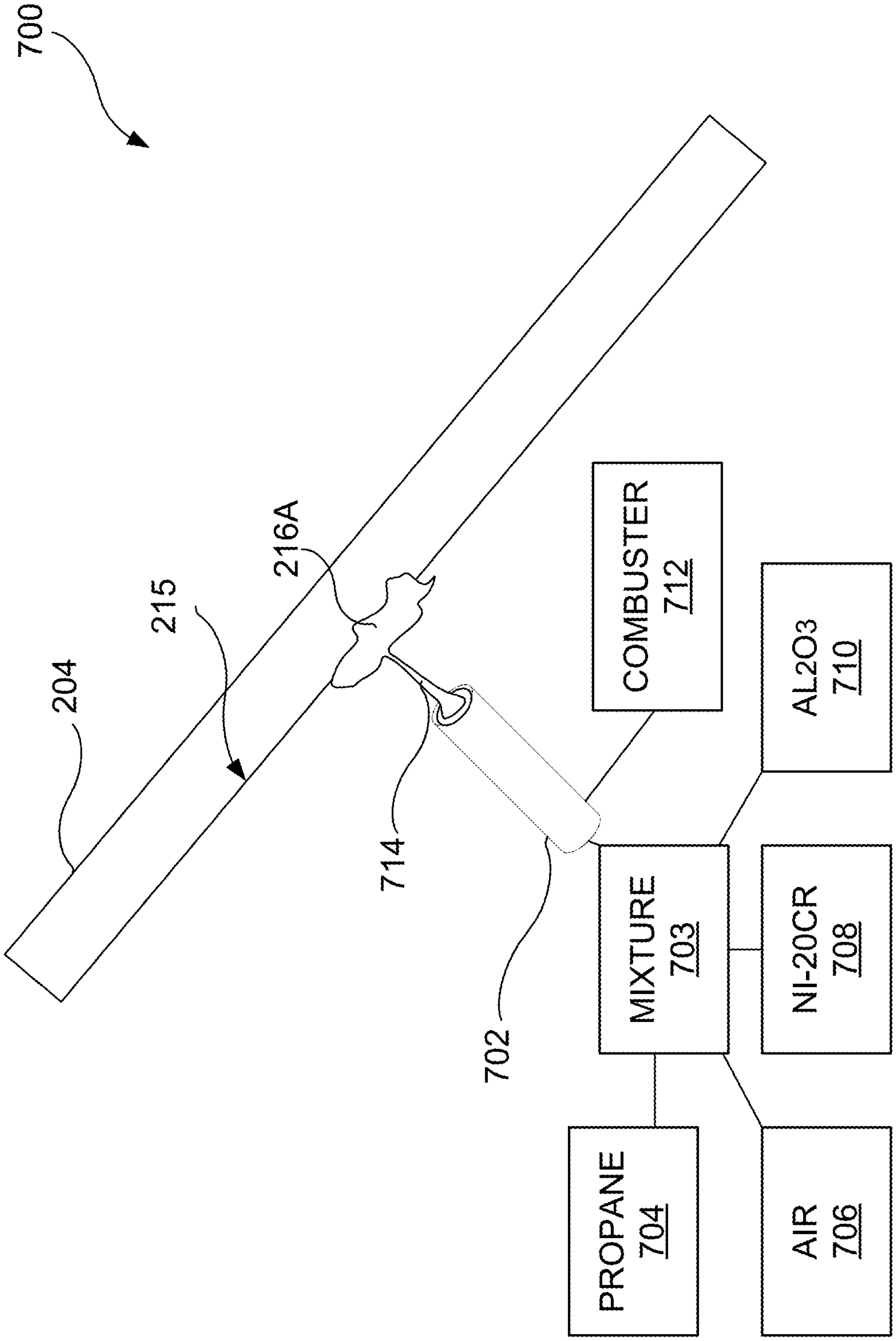
FIG. 7 is an example system for depositing a friction coating on a surface of a material, in accordance with various examples of the presently disclosed subject matter.

FIG. 7 is an example HVAF system 700 for depositing the friction coating 216A on the upper surface 215 of the second material 204, in accordance with various examples of the presently disclosed subject matter. The HVAF system 700 includes a nozzle 702 that receives a mixture 703 of propane 704, air 706, Ni-20Cr 708, and $Al_2O_3$ 710. It should be noted that the use of HVAF as well as the deposited materials described in FIG. 7 are merely an example for the purposes of illustration, as other deposition or application processes may be used to deposit or apply the friction coating 216A. The mixture 703 enters the nozzle 702. A combustor 712, such as a spark plug or other ignition system, ignites the propane 704, creating high pressure within the nozzle 702. The combustion temperature ranges from 1200-1800 C depending on fuel gas and torch design. Combustion temperatures within this range can provide for the rapid heating of the Ni-20Cr 508 and $Al_2O_3$ 710 to near the metal's melting temperature. The high pressure accelerates the mixture 703 at velocities from approximately 800 m/s to over 1400 m/s thru the nozzle 702 to generate a flame 714. The Ni-20Cr 508 and $Al_2O_3$ 710 within the flame 714 are deposited onto the upper surface 215 of the second material 204.

Figure 8:
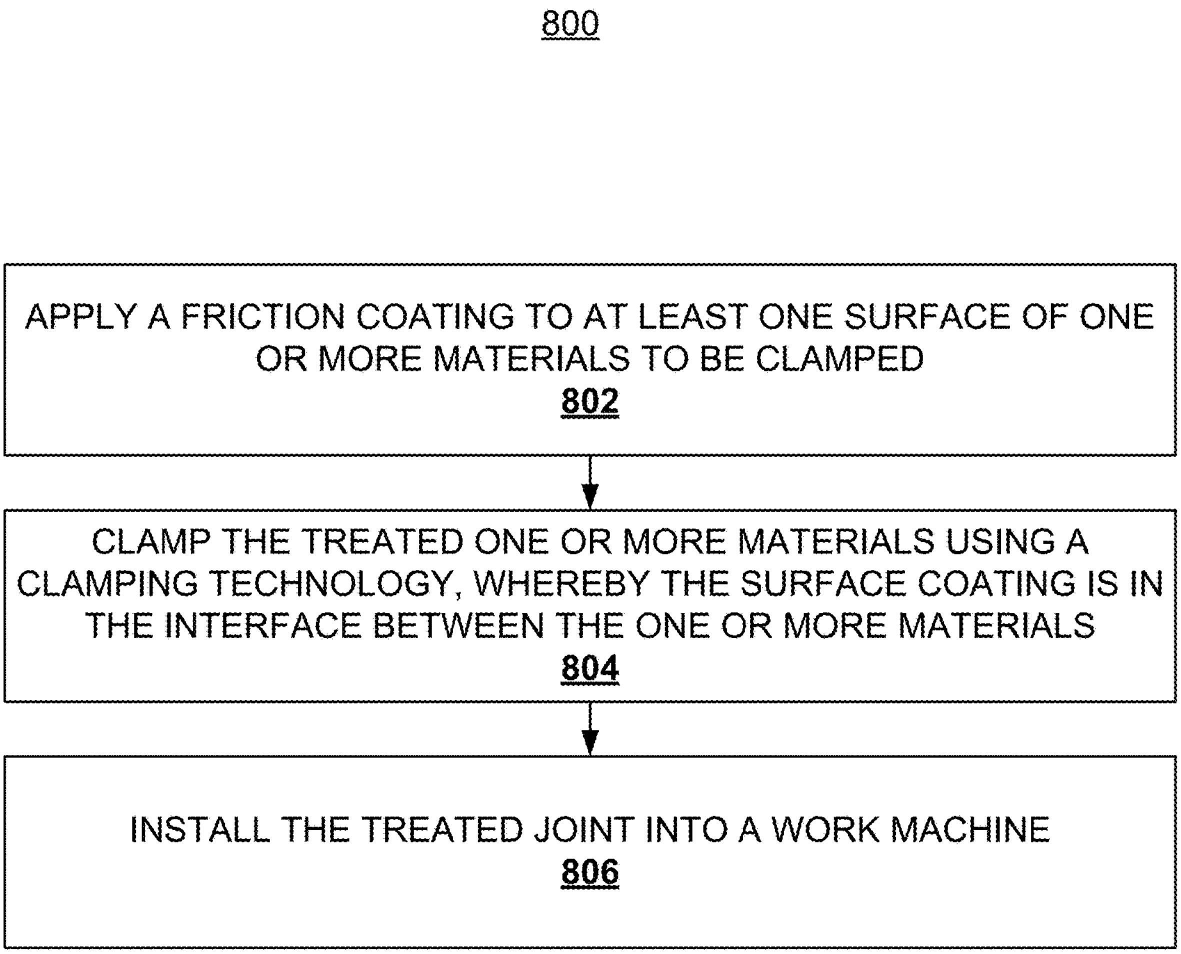
FIG. 8 illustrates a method of constructing a joint using surface coatings to reduce clamp load loss, in accordance with various examples described herein.

FIG. 8 illustrates a method 800 of constructing a joint using surface coatings to reduce clamp load loss, in accordance with various examples described herein. As shown in FIG. 8, at step 802, the friction coating 216 is applied to at least one surface of a material to be clamped to another material. The friction coating 216 can be deposited using various technologies including, but not limited to, a high velocity air fuel (HVAF) process, a high-velocity oxygen-fuel (HVOF) process, a plasma-arc spray process, a twin-wire arc spray process, a low energy welding process, an electro spark deposition process, or a glued particles process. The friction coatings 216 can comprise one or more metals and/or alloys, including, but not limited to: a tungsten/carbide alloy: a stellite/carbide alloy: an alloy of iron, chromium, boron, manganese, silicone, and nickel: or Ni-20Cr, aluminum oxide ($Al_2O_3$) particles. The surfaces can also include one or more interstitial spaces between the one or more friction coatings 216.

In step 804, the two or more materials are clamped using various technologies, whereby the friction coatings 216 are located in the interface between the two clamped materials. Various technologies may be used to clamp the materials together including, but not limited to, bolts, rivets, threaded fasteners and tapped holes, threaded components, and the like.

In step 806, the treated, joint may be installed onto a machine, such as the machine 100 of FIG. 1. It should be noted that in some examples, one or more surfaces of the materials to be clamped in situ, or already installed on the machine. In other examples, a treated material may be clamped onto a material already installed on the machine. The presently disclosed subject matter is not limited to any particular installation configuration.

Those of ordinary skill in the field will also appreciate that the principles of this disclosure are not limited to the specific examples discussed or illustrated in the figures.

INDUSTRIAL APPLICABILITY

The present disclosure provides friction coatings that are configured to reduce clamp load loss. Machines and other equipment may have joints that are formed by compressing one material, typically a metal, to another material using bolts or other types of securement or compressing technologies. During the use of the joint, the joint may experience expansion from the securement means (e.g., stretching) or compression of the clamped surfaces. These and other factors may reduce the amount of pressure applied to the surfaces of the material, causing a reduction or loss of clamp load. If significant enough, the materials may rotate or move in relation to each other, potentially resulting in a failure of the joint or damage to the equipment. The presently disclosed subject matter describes the use of a friction coating deposited in the interface between the one or more materials being clamped. The friction coating provides microscopic, elevated surfaces in the interface. Although not intending to limit the presently disclosed subject matter to any particular theory of operation, the friction coatings 216, in some examples, the elevated surface of the friction coating provide an additional rotational barrier as the materials move apart in the interface caused by clamp load loss. Specifically, in some examples, as the materials separate due to clamp load loss, the friction coatings provide a degree of rotational friction, reducing the ability of the clamped materials to rotate with respect to each other. In some examples, a source of the increased friction is the hard particles of the friction coating embedding into either or both of the clamped materials at the interface when a bolt (or other tightening technology) is tightened. Once the particles of the friction coating are embedded into the mating surface (interface) and mechanically/metallurgically bonded to the coated surface, a shear load required to slip the joint substantially increases. This increase in shear load is because the slipping of the joint, using the friction coating of the presently disclosed subject matter, requires the plastic deformation of the mating surface at each embedded particle location of the friction coating.

Table 1, below; illustrates an improvement in the maintenance of the coefficient of friction using the friction coatings.

TABLE 1

| | Clamp Load Lost | | Coefficient of Friction | | |
|---|---|---|---|---|---|
| Center Plate Coating | Max. | Avg. | Min. | Avg. | Std. Dev. |
| Baseline - No Coating | 10% | 5% | 0.13 | 0.17 | 0.03 |
| Baseline - No Coating (Reassembled and Retested | 3% | 3% | 0.15 | 0.17 | 0.01 |
| Staggered Circle Friction Coatings | 5% | 2% | 0.39 | 0.62 | 0.25 |
| Staggered Circle Friction Coating - Reassembled and Retested | 3% | 3% | 0.36 | 0.37 | 0.03 |

As shown in Table 1, the friction coatings applied in a staggered circle, similar to the friction coatings 216 of FIG. 3, have a higher coefficient of friction and maintain a large percentage of that coefficient of friction when the materials are separated and reassembled. Further, the average percentage of clamp load lost using the friction coatings can be lower than an uncoated surface.

The frictional coatings 216 can be applied in various manners. As described above, the frictional coatings 216, in some examples, are deposited or applied in a manner whereby the friction coatings 216 are separated by interstitial spaces 220. Although not intending to limit the presently disclosed subject matter to any particular theory of operation, the interstitial spaces 220, in some examples, can help to maintain the level of the surface of the clamped materials to work in conjunction with the friction coatings 216, e.g., provide the surface upon which the friction coatings 216 interact with. For example, in a dense deposition of friction coatings with little to no interstitial spacing, the surfaces of the clamped materials in the interface 221 can be compressed or deformed. Because, in some examples, the friction coatings 216 maintain a degree of rotational friction by interacting with the surfaces of the clamped materials in the interface 221, a high degree of compression or deformation of those surfaces can reduce the amount of surface available to the friction coatings 216 to interact with, thus potentially reducing the efficacy of the friction coatings 216 to maintain a degree of rotational friction. In some examples, the use of interstitial spaces 220 maintain a degree of elevation of the clamped surfaces. Thus, as described hereinabove, the friction coatings of the presently disclosed subject matter can increase and maintain the coefficient of friction between clamped surfaces, thereby, in some examples, effectively reducing clamp load loss.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A: B; C: A and B; A and C: B and C: A, B, and C: or multiple of any item such as A and A: B, B, and C: A, A, B, C, and C: etc.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A machine, comprising:
- a frame;
- a first component associated with the frame, the first component having:
- a first surface, and
- a friction coating deposited at a plurality of discrete regions arranged within a pattern on the first surface within a first area, each region of the plurality of discrete regions comprising a surface layer of friction coating particles disposed within a closed-shape having a defined perimeter and each region of the plurality of discrete regions being separated from a remainder of the plurality of discrete regions by an interstitial space between defined perimeters of adjacent regions of the first surface that is without the friction coating, and wherein the friction coating comprises particles having a particle size of less than 200 μm;
- a second component associated with the frame, the second component having a second surface with a second area; and
- a fastener extending through the first area of the first component and the second area of the second component, the fastener applying compressive force to the first component and the second component, wherein the first area of the first component is in contact with the second area of the second component in response to the compressive force, the friction coating deposited at the plurality of discrete regions on the first surface being held in contact with the second surface by the fastener.

2. The machine of claim 1, wherein the first area and the second area including each region of the plurality of discrete regions is located within a cone of compression generated by the compressive force.

3. The machine of claim 1, wherein a first region of the plurality of discrete regions is located within a cone of compression generated by the compressive force, and a second region of the plurality of regions is located outside of the cone of compression.

4. The machine of claim 1, wherein the friction coating comprises:
- a tungsten/carbide alloy;
- a stellite/carbide alloy;
- an alloy of iron, chromium, boron, manganese, silicone, and nickel; or
- Ni-20Cr, aluminum oxide ($Al_2O_3$) particles.

5. The machine of claim 1, wherein the friction coating is deposited by:
- a high velocity air fuel (HVAF) process;
- a high-velocity oxygen-fuel (HVOF) process;
- a plasma-arc spray process;
- a twin-wire arc spray process;
- a low energy welding process;
- an electro spark deposition process; or
- a glued particles process.

6. The machine of claim 1, wherein the defined perimeter of a region of the plurality of discrete regions comprises a circular shape, a hexagonal shape, a square shape, or a rectangular shape.

7. The machine of claim 1, wherein the compressive force causes deformation of the second surface by the friction coating such that a portion of the interstitial space of the first surface contacts corresponding portions of the second surface.

8. The machine of claim 1, wherein a hardness of the friction coating is greater than or equal to a hardness of the second surface.

9. A joint, comprising:
- a first component having a first surface with a first area;
- a second component having a second surface with a second area, wherein the first area of the first surface is in compressive contact from a compressive force with the second area of the second surface at an interface between the first surface of the first component and the second surface of the second component;
- a fastener inserted through the first area of the first component and the second area of the second component, wherein the compressive force is provided by a nut tightened onto the fastener; and
- a plurality of discrete friction coating regions comprising friction coating material deposited onto the first surface or the second surface within the first area or the second area respectively, wherein the plurality of discrete friction coating regions:
- are arranged in a pattern within the first area or the second area, each region of the plurality of discrete regions comprising a surface layer of friction coating particles disposed within a closed-shape having a defined perimeter; and
- define a plurality of interstitial spaces disposed between each of the plurality of discrete friction coating regions and a remainder of the plurality of discrete regions between defined perimeters of adjacent regions, wherein the plurality of interstitial spaces are devoid of the friction coating material;
- wherein the friction coating material comprises particles having a particle size in a range of approximately 5 μm to approximately 200 μm; and
- wherein the friction coating material deposited at the plurality of discrete regions on the first surface or the second surface held in contact with the other of the first surface or the second surface by the fastener.

10. The joint of claim 9, wherein at least a first discrete friction coating region is deposited within a cone of compression generated by the compressive force.

11. The joint of claim 10, wherein at least a second discrete friction coating region is deposited outside of the cone of compression generated by the compressive force.

12. The joint of claim 9, wherein the discrete friction coating regions comprise:
- a tungsten/carbide alloy;
- a stellite/carbide alloy;
- an alloy of iron, chromium, boron, manganese, silicone, and nickel; or
- Ni-20Cr, aluminum oxide ($Al_2O_3$) particles.

13. The joint of claim 9, wherein the discrete friction coating regions are deposited by:
- a high velocity air fuel (HVAF) process;
- a high-velocity oxygen-fuel (HVOF) process;
- a plasma-arc spray process;
- a twin-wire arc spray process;
- a low energy welding process;

an electro spark deposition process; or a glued particles process.

14. The joint of claim 9, wherein the defined perimeter of at least one of the plurality of discrete friction coating regions comprises a circular shape.

15. The joint of claim 9, wherein the plurality of discrete friction coating regions are deposited in a generally circular pattern distally from a center of the joint.

* * * * *